E. P. BAIRD.
LOCKING DEVICE FOR MOTOR VEHICLES.
APPLICATION FILED MAY 26, 1915.
1,215,465. Patented Feb. 13, 1917.
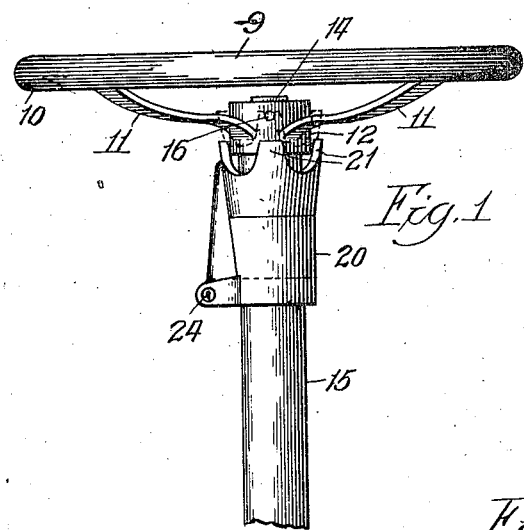
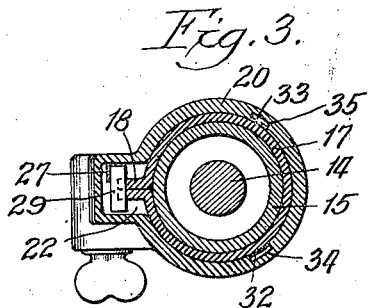
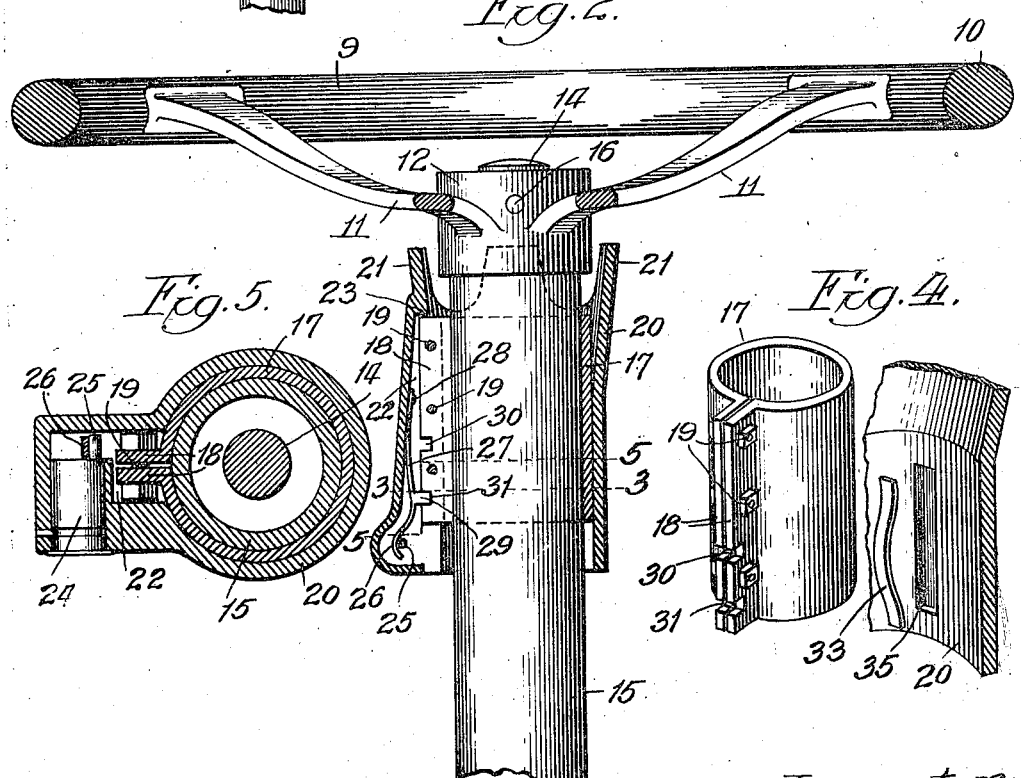
Witness:
John Enders
Inventor:
Edward P. Baird
by Fred Gerlach
his Atty.

UNITED STATES PATENT OFFICE.

EDWARD P. BAIRD, OF EVANSTON, ILLINOIS.

LOCKING DEVICE FOR MOTOR-VEHICLES.

1,215,465. Specification of Letters Patent. Patented Feb. 13, 1917.

Application filed May 26, 1915. Serial No. 30,520.

*To all whom it may concern:*

Be it known that I, EDWARD P. BAIRD, a resident of Evanston, in the county of Cook and State of Illinois, have invented certain new and useful Improvements in Locking Devices for Motor-Vehicles, of which the following is a full, clear, and exact description.

The invention relates to locking devices for motor vehicles.

One object of the invention is to provide an improved locking-device for preventing a motor-vehicle from being stolen by making it impossible to steer the vehicle. Another object of the invention is to provide an improved steering wheel-lock which is simple in construction and may be readily applied as an attachment to steering wheels of usual construction. A still further object of the invention is to provide an improved lock for steering devices which can be produced at a low cost and which can be easily applied to the vehicle.

The invention consists in the several novel features hereinafter set forth and more particularly defined by claims at the conclusion hereof.

In the drawings: Figure 1 is a side elevation of a steering device provided with the invention. Fig. 2 is a vertical section. Fig. 3 is a section taken on line 3—3 of Fig. 2. Fig. 4 is a perspective of the sleeve for attaching the locking-device to a steering column. Fig. 5 is a section taken on line 5—5 of Fig. 2.

The improved device is adapted for attachment to a steering device of usual construction, as exemplified by the steering-wheel 9 comprising a rim 10, spokes 11 and hub 12, which is secured to a steering shaft 14. The steering shaft extends through a hollow fixed column 15 and the hub 12 is usually secured to the upper end of said shaft. The spokes 11 and hub 12 are usually integrally formed, so that a locking-device applied to the spokes will effectively lock the wheel against rotation. A pin 16 usually secures the hub 12 to the shaft 14.

A band 17 which may be formed of sheet metal, fits snugly around the column 15 and is provided with flanges 18. Bolts 19 pass through these flanges and are adapted to contract the sleeve to firmly clamp it in position on the steering column 15. This band exemplifies a clamp adapted to be secured to the steering column and which is surrounded by the locking-sleeve 20, so that the band will be inaccessible and cannot be loosened while the sleeve is on the band. Sleeve 20 is slidable longitudinally and is provided with upwardly extending teeth or lugs 21 adapted to pass between the spokes 11 of the steering wheel and is disposed adjacent the hub 12, so that when the teeth or lugs are moved upwardly between the spokes, the steering-wheel cannot be rotated. These teeth are also adapted to cover the securing pin 16 when they are in operative position, so that the pin cannot be removed. The locking sleeve 20 is provided with a chamber 22 for the reception of the flanges 18 of the clamp and the bolts 19, and this connection prevents relative rotation of the clamp and the locking-sleeve 20. The wall of the sleeve is extended around this space 22 and to form a stop 23 adapted to engage the upper end of the clamp flanges and limit the downward movement of the locking sleeve on the clamp. A key-operable cylinder-lock 24 is rotatably fitted and held in the sleeve 20 adjacent the lower end of the sleeve and is provided with an eccentric pin 25 which is adapted to engage the lower end 26 of a locking member 27, the upper end of which is secured, as at 28, to the wall of sleeve 20. Member 27 is resilient and provided with a tooth 29 adapted to enter either of two notches 30 and 31 in the flanges of the clamping band to lock the sleeve 20 in operative and inoperative positions, respectively.

Flat slightly bowed resilient strips 32 and 33 are held in pockets 34 and 35 formed in the sleeve 20 to prevent rattling in event that the sleeve 20 does not fit snugly on the clamp.

When tooth 29 on locking-member 27 is disposed in notch 31, the sleeve 20 will be secured against upward movement by said member to hold the sleeve so that the spokes of the steering-wheel will be free to be rotated to steer the vehicle. When the steering-wheel is to be locked, the key will be inserted into the cylinder-lock 24 and turned to cause the eccentric pin 25 to move the lower end 26 of member 27 outwardly and withdraw tooth 29 from notch 31. The sleeve 20 can then be raised until the tooth 29 passes into notch 30. The key can be withdrawn after sleeve 20 has been released from the notch 31 and moved upwardly sufficiently to cause tooth 29 to ride on the outer edge of flanges 18. When tooth 29 has passed into notch 30, the teeth or lugs 21 will be locked between the spokes 11 of the steering-wheel, so that it will be impossible to steer the vehicle and consequently impossible to steal it. To unlock the steering-wheel, cylinder lock 24 will be operated by a key to withdraw tooth 29 from notch 30. whereupon the sleeve 20 will be free to fall into inoperative position. Sleeve 20 is at all times held against rotation by the bolts 19 fitting in the offset space 22. The locking member 27 is at all times effectively inclosed against fraudulent manipulation.

To apply the device to a steering column, it is only necessary to remove the steering wheel from its shaft, then secure the clamp in position on the steering column, then slip the locking sleeve down over the clamp, and then replace the wheel.

The invention exemplifies a locking device for a steering wheel which may be attached to a column for the steering shaft of usual construction without the necessity of drilling or otherwise changing the construction of said column.

The invention is not to be understood as restricted to the details set forth, since these may be modified within the scope of the appended claims without departing from the spirit and scope of the invention.

Having thus described the invention, what I claim as new and desire to secure by Letters Patent, is:

1. The combination with steering mechanism comprising a column and a steering wheel mounted at the top of the column, of a band fitting around the column, means for clamping the band to the column, a locking sleeve for securing said wheel against rotation, slidably mounted on the band, and means for locking the sleeve in position to secure the wheel against rotation.

2. The combination with steering mechanism comprising a column and a steering wheel mounted at the top of the column, of a longitudinally split band fitting around the column, means for clamping the band on the column, a locking sleeve for securing the wheel against rotation, slidably mounted on the sleeve, and means for locking the sleeve in position to secure the wheel against rotation.

3. The combination with steering mechanism comprising a column and a rotatable controller wheel over the column, and having spokes, of a sleeve movable vertically along the column and provided with means adapted to pass between the spokes of the wheel to secure it against rotation and prevent the vehicle from being steered, and locking-means for securing said sleeve in position to lock said wheel.

4. The combination with steering mechanism comprising a column and a rotatable controller wheel over the column and having spokes, of a sleeve movable vertically along the column, provided with means adapted to pass between the spokes of the wheel to secure it against rotation and prevent the vehicle from being steered and secured against rotation around the column and locking-means for said sleeve.

5. The combination with steering mechanism comprising a column and a rotatable controller wheel over the column and having spokes, of a band clamped to the column, a sleeve movable vertically along the band and provided with means adapted to pass between the spokes of the wheel to secure it against rotation and prevent the vehicle from being steered, and locking-means between said sleeve and said band.

6. The combination with steering-mechanism comprising a column and a steering wheel above the column, of a clamp adapted to be secured to and extending around said column, a sleeve provided with means for securing the wheel against rotation to prevent the vehicle from being steered, slidably mounted on the clamping sleeve, said clamp having flanges, said sleeve extending around said flanges and being held against rotation thereby and locking-means for securing the sleeve against longitudinal movement on the clamp.

7. The combination with steering mechanism comprising a column and a steering wheel mounted at the top of the column, of a contractible band adapted to extend around said column, means for contracting the band to clamp it around the column, a sleeve provided with means for securing the wheel against rotation, slidably mounted on said band, and a lock for the sleeve.

8. The combination with steering mechanism comprising a column and a steering wheel mounted at the top of the column, of a split band comprising a portion adapted to extend around the column and flanges, means extending through the flanges for clamping the band on the column, a sleeve provided with means for securing the wheel against rotation, and a lock for said sleeve.

EDWARD P. BAIRD.

Witnesses:
 MILDRED STUMPF,
 KATHARINE GERLACH.